United States Patent [19]
Schertler

[11] 3,785,612
[45] Jan. 15, 1974

[54] QUICK-ACTING GATE VALVE

[75] Inventor: Siegfried Schertler, Haag, Switzerland

[73] Assignee: VAT Aktiengesellschaft fur Vakuum-Apparate-Technik, Haag, Switzerland

[22] Filed: Oct. 6, 1972

[21] Appl. No.: 295,642

[30] Foreign Application Priority Data
Oct. 25, 1971 Switzerland...................... 15489/71

[52] U.S. Cl. .................................................. 251/43
[51] Int. Cl. ............................................ F16k 31/12
[58] Field of Search........................... 251/33, 41, 43

[56] References Cited
UNITED STATES PATENTS
| | | | |
|---|---|---|---|
| 1,658,445 | 2/1928 | Knauf | 251/43 X |
| 1,925,301 | 9/1933 | Campbell | 251/43 X |
| 2,753,146 | 7/1956 | Wiegers | 251/33 X |

*Primary Examiner*—Henry T. Klinksiek
*Attorney*—Sughrue, Rothwell, Mion, Zinn and Macpeak

[57] ABSTRACT

A quick-acting valve having a valve closure disc connected by a spindle or stem to the holding plate of an electromagnet incorporated in a spring biased piston disposed in a pneumatic cylinder. The face of the holding plate is partially undercut so that when the valve is open and the elctromagnet is deenergized, the fluid pressure acting on the undercut surface and on the closure disc abruptly moves the plate, spindle and disc toward the closed position. As soon as the plate separates from the magnet its effective surface area increases, which accelerates the valve closing. The spring thereafter urges the piston against the plate to maintain the valve closed. To open the valve the pressure above the piston is vented and the magnet is energized, which forces the piston, plate, spindle and disc upwards against the spring force.

7 Claims, 2 Drawing Figures

QUICK-ACTING GATE VALVE

BACKGROUND OF THE INVENTION

1. Field of the Invention

The invention relates to a quick-acting gate valve having a valve disc, which in the closed position is pressed against a valve seat by a spring and which is connected to a holding member via a valve stem. The holding member may be brought into an open position against the force of this spring by means of a displaceable pneumatic piston. The holding member may be kept in the open position by magnetic coupling means which have to be released to start the closing process.

2. Prior Art

In the quick-acting gate valve described in Swiss Patent No. 503,939 a closing spring acts upon a valve disc, and a holding member, consisting of an anchor plate, is retained by an electromagnet integral with the valve housing when it has been urged against the electromanet by a pneumatically activated piston acting against a first powerful spring. After reversal of a valve the piston is then returned to its starting position by a second less powerful spring so that the first power spring does not have to accelerate the piston in order to close the valve when the exciting current for the electromagnet is switched off. Furthermore, the electromagnet does not have to tension the first spring during its excitation as was the case with previous valves. It can thus be substantially smaller than these earlier valves. As a result the closing period, which is determined both by the mass to be moved and the inductivity of the magnet coil, is also reduced.

SUMMARY OF THE INVENTION

The object of the present invention is thus to produce a valve which closes more rapidly and with which even greater sealing forces may be obtained using an even more powerful spring and further reducing or even omitting the electromagnet altogether. According to the invention this is achieved in the following way: the spring acts upon the piston provided with the coupling means for the holding member; the holding member is held by the coupling means in the coupling position on the side of the piston facing the valve disc against a lesser initial stressing force as compared to the spring force, a central part of the holding member sealing off a bore, which when the coupling means are released, connects a cylinder chamber facing the valve disc and permanently connected to a pressure gas source with a cylinder chamber facing away from the valve disc and adapted to be connected to the atmosphere via an air-vent valve in order to bring the piston together with the holding element coupled to it and the valve disc into the open position.

BRIEF DESCRIPTION OF THE DRAWINGS

The drawings show a preferred and an alternate embodiment of the invention, in which.

DESCRIPTION OF THE PREFERRED EMBODIMENTS

Figure 1:
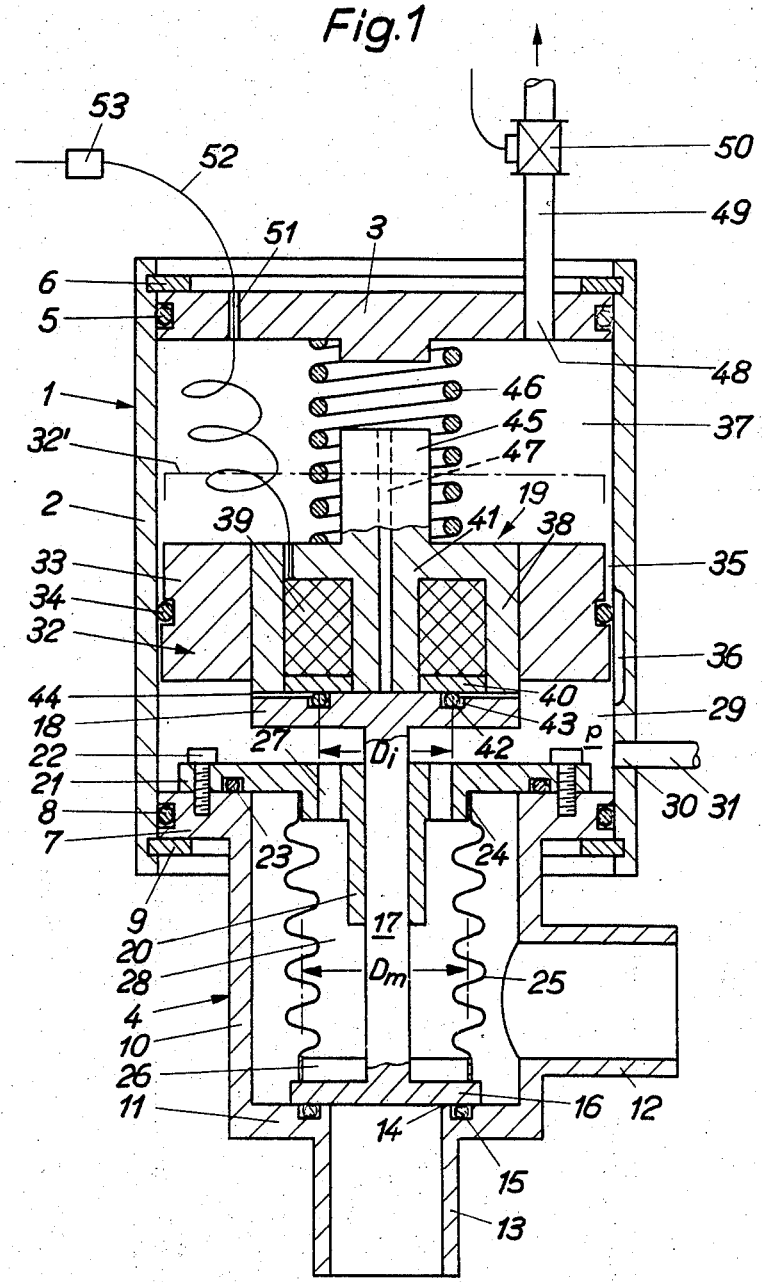
FIG. 1 is a diagrammatic longitudinal view through a preferred embodiment of a quick-acting valve in accordance with this invention.

The valve shown in FIG. 1 is provided with a jacket 1, consisting of a cylindrical casing 2, a cover 3 and a lower part 4. The cover 3 is sealed on the casing 2 by means of a packing 5 and is secured in the same by a clip ring 6. The lower part 4 is provided with a flange 7, which is sealed on the casing 2 by means of a packing 8 and is secured to the same by means of a clip ring 9. The lower part 1 also has a cylinder casing 10 which has a smaller diameter than the casing 2 and which is terminated at the bottom by a base 11. A lateral connecting part 12 projects from the casing 10 and an axial connecting part 13 projects from the base 11. The conduits, for example, vacuum pipes, which are to be connected together or separated from one another by the valve are connected to the parts 12 and 13.

The part of the base 11 surrounding the port of the part 13, forms a valve seat 14, which is provided with a packing 15. A valve disc 16, which is shown in the closed position, rests on the valve seat. This valve disc 16 is connected to an axial valve stem 17, to the upper end of which is attached a plate 18 made of magnetizable material and forming the anchor of an electromagnet 19 serving as a coupling means. The valve stem 17 passes through a guide bush 20 provided on an intermediate bottom 21, which is secured to the flange 7 by means of screws 22 and is sealed on the same by means of a packing 23. On its lower side the intermediate bottom 21 is provided with a recessed part 24 to which the upper end of a spring bellows 25 is attached. The spring bellows 25, the median diameter of which is designated by $D_m$, is secured at the bottom to the collar 26 of the valve disc 16. Two or more holes 27 provided in the intermediate bottom 21 connect the chamber 28 surrounded by the spring bellows 25 with a lower cylinder chamber 29 located above the intermediate bottom.

The chamber 29 is connected via a connecting orifice 30 provided in the casing 2 to a compressed air pipe 31 and is limited above by a piston 32 displaceable in this casing 2. The piston 32 consists of an electromagnet 19 and an annular member 33 fixedly connected to the same and outwardly sealed to the casing 2 by means of a packing 34. A narrow annular chamber 35 is provided above the packing 34 between the annular body 33 and the casing 2. A small pressure equalizing channel 36 is provided in the casing 2. When the piston 32 is supported on the holding plate 18 the pressure equalizing channel 36 connects the lower cylinder chamber 29 with a point on the annular chamber 35 located directly above the packing 34 thus connecting the lower cylinder chamber 29 to an upper cylinder chamber 37 located above the piston 32.

The electromagnet 19 has an E-shaped cross-section 38. A magnet coil 39 is housed in the magnet and is firmly held in place by sealing compound ring 40. A central part 41 of the magnet and part of the sealing compound ring 40 are supported on the plate 18 and on an annular packing 42 provided on its upper side. There is a small space 44 between the plate 18 and the magnet outside a groove 43 containing the annular packing 42. The diameter of the packing 42 designated by $D_i$ is smaller than the diameter $D_m$ of the spring bellows 25. The magnet is provided with a central projection 45 serving to guide a lower part of a powerful pressure spring 46 which rests on the cover 3 and presses the piston 32 downwards. An axial bore 47 which passes through the part 41 of the magnet and its projection 45, connects the cylinder chambers 29 and 37 as long as the piston 32 is not in the closed position shown.

The upper cylinder chamber 37 is connected, for example, to an electrically controllable vent valve 50 via a connecting orifice 48 provided in the cover 3 and a line 49. In the cover 3 there is also a duct 51 for two core electric cable 52 which connects the magnet coil 39 to a current source via a switch 53.

The above-described valve operates as follows. When the quick-acting valve is in the position shown, the vent valve 50 is closed while the electromagnet 19 is unenergized. To open the quick-acting gate valve, the vent valve 50 is opened and the electromagnet 19 is excited by closing the switch 53. As the pressurized air contained in the upper cylinder chamber 37 escapes to the atmosphere through the vent valve 50, the pressurized air in the lower cylinder chamber 29 moves the piston 32 upwards until its projection 45 abuts against the cover 3. During this process the electromagnet 19 moves the holding plate 18 upwards so that the valve disc 16 is also raised from the valve seat 14 by the stem 17. As the pressure equalizing channel 36 is now no longer connected to the annular chamber 35 above the piston packing 34 and the axial bore 47 is closed off below by the holding plate 18 and the packing 42, the piston 32 remains in its upper position even if the vent valve 50 is closed again while the pressure in excess of atmospheric pressure prevailing in the lower cylinder chamber 29 overcomes the force of the spring 46.

The following are upwardly acting forces on the holding plate 18:

A = the power of attraction of the electromagnet 19;
B = the pressure p of the air in the lower chamber 29 acting on the lower surface of the holding plate 18;
C = the pressure in the valve chamber acting on the lower surface of the valve disc 16 when the valve disc 16 is raised from the valve seat 14 in the lower part of the housing.

The following are downwardly acting forces on the holding plate 18:

D = the pressure $p$ acting on the annular surface of the plate 18, said annular surface being limited internally by the packing 42;
E = the pressure inside the bellows 25 acting on the upper surface of the valve disc 16. This pressure E is equal to the pressure $p$ in the chamber 29.

The force exerted by the spring bellows 25 on the valve disc 16 is negligible. The force C is also negligible in the case of valves for vacuum devices. The difference between the forces B and D with the valve open is an upwardly directed force which is exerted by the pressure p within the circle of radius $D_i$ on the lower surface of the holding plate 18 and which is somewhat smaller than the downwardly directed force E exerted by the pressure p on the valve disc 16 because $D_i$ is somewhat smaller than $D_m$. The following formula should be observed to ensure that the holding plate 18 adheres to the electromagnet 19:

$$A > p \cdot (\pi/4) (D_m{}^2 - D_i{}^2) = V$$

As the downwardly directed initial stressing force V can be made much smaller than the force F of the spring, a relatively small electromagnet 19 is sufficient to produce an adequate force of attraction. The force of the tensioned spring 46 does not have to work against the electromagnet 19 whereas in the case of the known quick-acting gate valve mentioned initially the electromagnet did not have to tension the closing spring as in the case of earlier valves but it did have to keep it in a stressed state by way of the anchor plate.

To close the valve it suffices to open the switch 53 so that the power of attraction A of the electromagnet 19 disappears and it does so far more rapidly than was the case with the larger electromagnets required previously. Since $D_m{}^2 > D_i{}^2$ the pressure p of the initial stressing force V moves the holding plate 18 downwards and as soon as the packing 42 has moved only a short distance from the terminal part 40 of the electromagnet 19 an additional downwardly directed force $p \cdot (\pi/4) \cdot D_i{}^2$ becomes effective since the pressure p now also acts on the upper face of the holding plate 18 inside the packing 42. As a result the holding plate 18 is moved downwards in a sudden movement until the valve disc 16 reaches the closed position on its seat 14. The pressure between the cylinder chambers 29 and 37 is now equalized via the bore 47 so that the spring 46 can press the piston 32 down onto the holding plate 18. When the packing 42 is again effective the pressure equalizing line 36 ensures that any pressure difference between the cylinders 29 and 37 is avoided as long as the quick-action valve is not opened again intentionally by opening the air vent valve 50. In the closed state the spring 46 holds the valve disc 16 on its seat 14. Depending on the pressure p and the dimensioning of the valve a practically complete sealing of the valve closure can be obtained by the pressure p alone or with only the spring 46 becoming effective as well. The bore 47 is so dimensioned that it acts as a throttle and thus prevents the spring 46 from moving the piston 33 downwards in a sudden movement. The latter moves somewhat slower than the disc 16.

An appropriately dimensioned pressure spring can be provided between the valve disc 16 and the intermediate base 21 instead of providing the holes 27 and using the force exerted by the pressure p on the valve disc 16 in order to produce the initial stressing force V which starts the movement of the holding plate 18.

Figure 2:
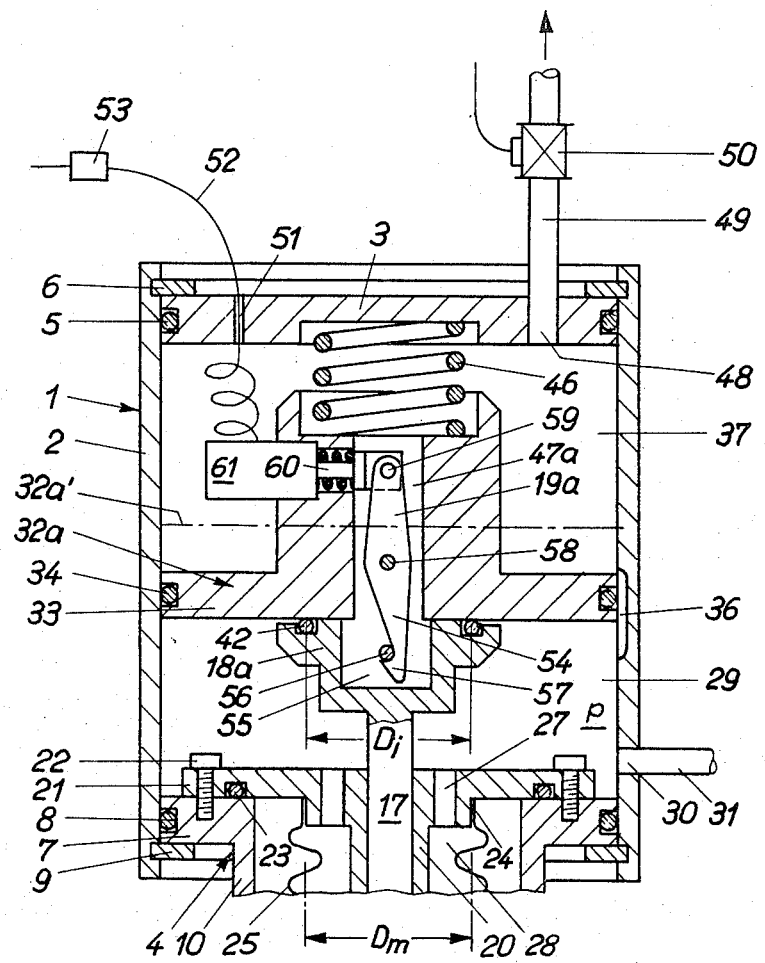
FIG. 2 is a similar, partial view of an alternate embodiment.

The embodiment according to FIG. 2 differs from the embodiment of FIG. 1 in that a retaining head 18a is provided on the upper end of the valve stem 17. This is not in the form of a holding plate of an electromagnet, but is held in the closed position of the valve by means of a pawl 19a on the piston 32a, said pawl serving as a coupling means. On the upper side of the retaining head 18a a packing 42 is provided which abuts against the lower side of the piston 32a in the closed position and as a result closes off an axial bore 47a provided in the latter. The retaining head 18a is provided on top with a central recess 55 in which is disposed a diametrical pin 56 on which a hook 57 provided on the lower end of the releasing pawl engages. The releasing pawl 19a is swivelable about a diametrical pin 58 mounted in the bore 47a and its end is connected by means of a hinged bearing 59 to the free end of a magnetizable plunger piston 60, which holds a pressure spring in the position shown as long as an electromagnet 61 in which the plunger piston 60 is displaceable, is not excited. The lower part of the valve, which is not shown, is identical to that according to FIG. 1. The same reference numerals are used in FIG. 2 as in FIG. 1 for corresponding parts.

The quick-acting gate valve according to FIG. 2 is also opened by opening the air vent valve 50 whereby the pressure $p$ brings the piston 32a into the position indicated at 32a' and the releasing pawl 19a secures the retaining head 18a. To close the valve the electromagnet 61 is briefly excited by closing the switch so that the plunger piston 60 is pushed against the force of the spring and the releasing pawl 19a is thus swiveled in an anticlockwise direction according to FIG. 2. The hook 57 then releases the pin 56 and as $D_m > D_i$ again, the packing 42 is disengaged from the piston 32a, whereupon the valve closes in a sudden movement. As the piston 32a thereafter moves down under the urging of spring 46, the releasing pawl 19a once again rides over and latches under the pin 56 to enable the valve for future opening.

The embodiment according to FIG. 2 has the advantage that the electromagnet 61 is even smaller than the electromagnet 19 and that no current at all is required to keep the valve open. In contrast, the electromagnet 19 according to the embodiment shown in FIG. 1 has to be constantly excited.

In the case of FIG. 2, other means, for example mechanical or pneumatic means, may be provided in place of the electromagnet to swivel the relasing pawl 19a and thus to close the valve.

What is claimed is:

1. In a quick-acting gate valve having a valve disc which when closed is pressed by a spring onto a valve seat and which is connected by a valve stem to a holding member, and wherein the valve may be opened by a piston pneumatically displaceable in a cylinder against the force of said spring and which is adapted to be kept open by coupling means which have to be released to initiate the closing process, the improvements characterized in that the spring acts upon the piston provided with coupling means for the holding member, the holding member is held in the coupling position by the coupling means on the side of the piston facing the valve disc against an initial stressing force less than the force of the spring, a central part of the holding member sealing off a bore, which when the coupling means is released, connects a cylinder chamber facing the valve disc and permanently connected to a fluid pressure source with a cylinder chamber facing away from the valve disc and adapted to be connected to the atmosphere via an air vent valve in order to bring the piston together with the holding member coupled to it and the valve disc into an open position.

2. A quick-acting valve according to claim 1, characterized in that an electromagnet forming a part of the piston is the coupling means, said electromagnet cooperating with the holding member.

3. A quick-acting gate valve according to claim 1, characterized in that a mechanical coupling means is provided on the piston.

4. A quick-acting gate valve according to claim 3, characterized in that a swivelable pawl is provided on the piston, said pawl securing a pin provided on the holding member in the coupling position and being adapted to be swiveled on excitation of an electromagnet into a position in which it releases this pin.

5. A quick-acting gate valve according to claim 1, characterized in that a pressure spring is disposed between the piston and a cylinder housing cover in the cylinder chamber facing away from the valve disc.

6. A quick-acting gate valve according to claim 1, characterized in that the valve stem is guided through an intermediate bottom of the cylinder housing, said intermediate bottom being provided with holes which connect the inside of the spring bellows, which is secured on one end to the intermediate bottom and on the other end to the valve disc, to the cylinder chamber facing the valve disc, and in that the mean diameter of the spring bellows is greater than the diameter of an annular packing seal provided between the piston and the holding member.

7. A quick-acting gate valve according to claim 1, characterized in that a pressure equalizing channel is provided in the side of the cylinder, said pressure equalizing channel connecting the two cylinder chambers together when the piston reaches the closed position.

* * * * *